United States Patent
Chen et al.

(10) Patent No.: US 9,380,218 B2
(45) Date of Patent: Jun. 28, 2016

(54) HIGHLIGHT EXPOSURE METRIC AND ITS APPLICATIONS

(71) Applicant: Apple Inc., Cupertino, CA (US)

(72) Inventors: Juanqing Chen, San Jose, CA (US); Xuemei Zhang, Mountain View, CA (US); Yingjun Bai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,791

(22) Filed: May 30, 2014

(65) Prior Publication Data

US 2015/0350512 A1      Dec. 3, 2015

(51) Int. Cl.
*H04N 5/235*     (2006.01)
*H04N 5/357*     (2011.01)
*G06T 3/40*      (2006.01)

(52) U.S. Cl.
CPC ........... *H04N 5/2355* (2013.01); *G06T 3/40* (2013.01); *H04N 5/357* (2013.01); *G06T 2207/10004* (2013.01); *G06T 2207/20208* (2013.01)

(58) Field of Classification Search
CPC ..... H04N 5/2355; H04N 5/357; H04N 5/235; H04N 5/2353; G06K 9/4642; G06K 9/46; G06T 3/40; G06T 2207/20208; G06T 2207/10004; G06T 5/009; G06T 11/20; G06T 2207/20016; G06T 7/2053; G06T 5/008; G06T 5/007; G06F 3/048; G06F 3/1454
See application file for complete search history.

(56) References Cited

U.S. PATENT DOCUMENTS

| | | | |
|---|---|---|---|
| 8,305,487 B2 | 11/2012 | Cha | |
| 8,339,475 B2 | 12/2012 | Atanassov | |
| 8,391,598 B2 | 3/2013 | Lin | |
| 8,570,394 B1 | 10/2013 | Maeng | |
| 8,570,396 B2 | 10/2013 | Rapaport | |
| 8,606,009 B2 | 12/2013 | Sun | |
| 2007/0230932 A1 | 10/2007 | Tanaka | |
| 2008/0131016 A1 | 6/2008 | Kokemohr | |
| 2008/0267494 A1 | 10/2008 | Cohen | |
| 2011/0058050 A1 | 3/2011 | Lasang | |
| 2011/0211732 A1* | 9/2011 | Rapaport | G06F 3/1454 382/171 |
| 2011/0254976 A1* | 10/2011 | Garten | G06F 3/1454 348/229.1 |
| 2012/0113130 A1 | 5/2012 | Zhai | |
| 2012/0170842 A1 | 7/2012 | Liu | |
| 2012/0188414 A1* | 7/2012 | Ross | H04N 5/2352 348/241 |
| 2013/0019196 A1 | 1/2013 | Bhatt | |
| 2013/0223739 A1 | 8/2013 | Tay | |
| 2013/0229546 A1 | 9/2013 | Furumura | |
| 2013/0294689 A1 | 11/2013 | Jia | |
| 2013/0335596 A1* | 12/2013 | Demandolx | H04N 5/2354 348/231.99 |
| 2014/0168486 A1* | 6/2014 | Geiss | H04N 5/335 348/294 |
| 2014/0232872 A1 | 8/2014 | Kussel | |
| 2014/0369410 A1 | 12/2014 | Olivier | |
| 2015/0092066 A1* | 4/2015 | Geiss | H04N 5/2258 348/180 |
| 2015/0170389 A1 | 6/2015 | Ming | |
| 2015/0235371 A1 | 8/2015 | Venkataraman | |
| 2015/0256734 A1 | 9/2015 | Fukuhara | |

* cited by examiner

*Primary Examiner* — Aung S Moe

(74) *Attorney, Agent, or Firm* — Blank Rome LLP

(57) ABSTRACT

Systems, methods, and computer readable media for the use of a metric whose value is especially sensitive to the information lost when an image's pixels are clipped are disclosed. The metric may be used as an image's score, where higher values are indicative of lost highlight information (more clipped pixels). One use of the disclosed metric would be to determine when the use of high dynamic range (HDR) techniques are appropriate. The disclosed metric may also be used to bias a scene's exposure value (EV) such as to a lower or underexposed value (EV−) so that the scene may be captured with no more than an acceptable number of clipped pixels.

20 Claims, 4 Drawing Sheets

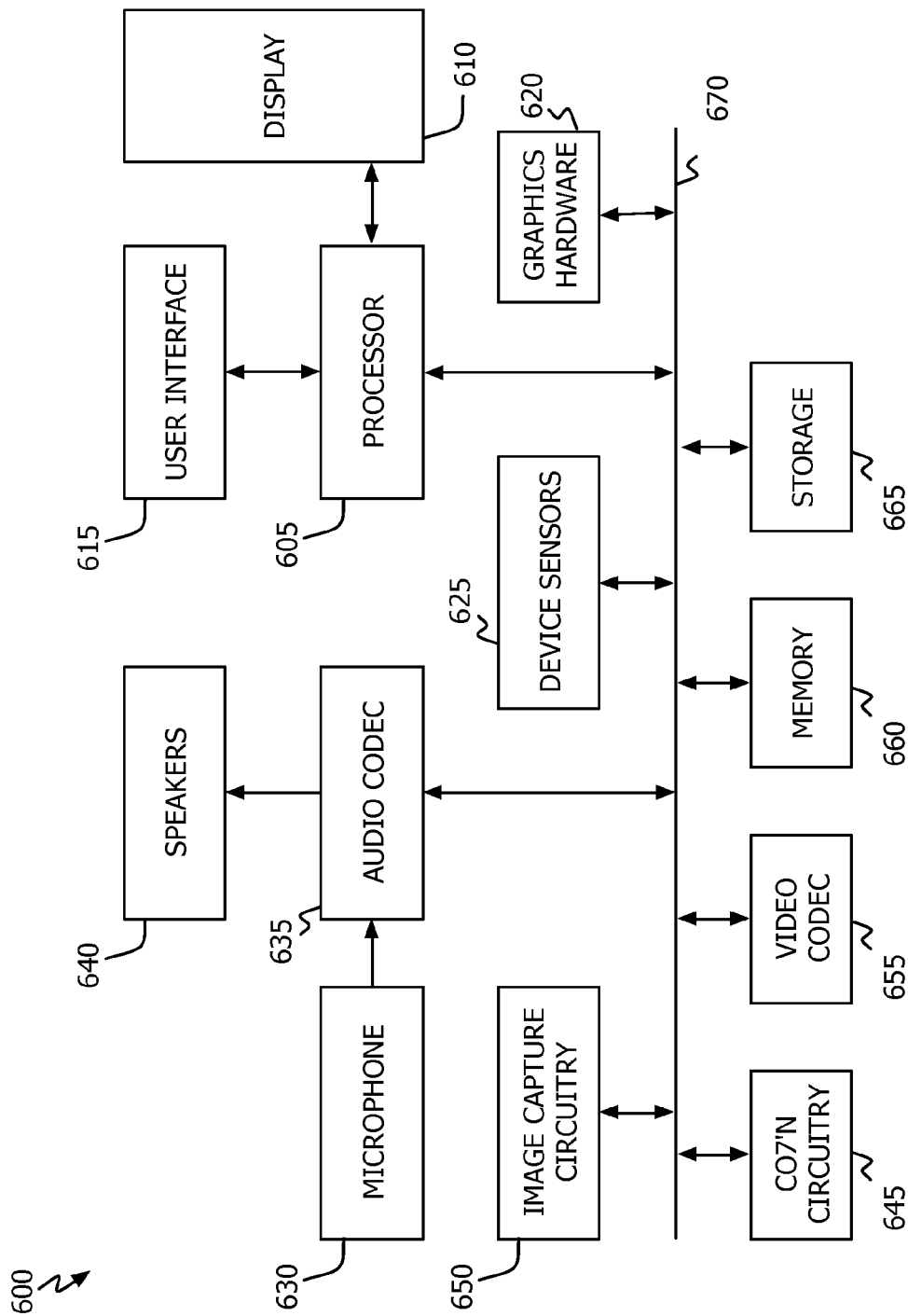

HIGHLIGHT EXPOSURE METRIC AND ITS APPLICATIONS

BACKGROUND

This disclosure relates generally to the field of digital photography. More particularly, this disclosure relates to the generation and use of a highlight exposure metric whose value is sensitive to the capture of an image's highlight information. The disclosed metric may be used, for example, to determine when high-dynamic-range (HDR) operations may be appropriate, the appropriate exposure value that will capture a scene without perceptual highlight loss, or to adjust the exposure ratio value between long- and short-exposure images during HDR operations. As used in this disclosure, the terms camera, digital camera, image capture system or device, digital image capture system or device, and the like are meant to refer to any device, component, element or system that has the ability to capture digital images (still and video).

Today, many personal electronic devices come equipped with digital cameras. Illustrative personal electronic devices include, but are not limited to, mobile phones, personal data assistants, portable music players, laptop computer systems, desktop computer systems, tablet computer systems and wearable electronic devices such as watches and glasses. Image sensors used in these types of devices often have relatively small dynamic ranges. That is, their ability to capture a range of light from total darkness to full sunlight in a single image is limited. Consumer-grade sensors often provide only 8-10 bits resolution. Such sensors can distinguish between 256-1024 different brightness levels (assuming no noise); generally an insufficient number to adequately represent the range of light to which they are exposed. One result of a scene exceeding a sensor's dynamic range is that pixels are clipped. As the number of clipped pixels increases, there comes a point where the image becomes unpleasant to look at.

High-dynamic-range imaging (HDRI or HDR) is a set of techniques used in digital capture systems to reproduce a greater dynamic range than is possible using standard single image capture techniques. HDR techniques often use exposure bracketing to capture multiple images at multiple different exposure values which are then merged into a single HDR image. While providing images with an extended dynamic range, these operations do not come for free. The decision as to whether to employ HDR in a given situation can be complex and is often a compromise between several factors including the computational complexity of implementation, noise, highlight recovery and the introduction of ghosting artifacts. In HDR operations, it is important to cover just the dynamic range needed to capture the scene—and no more (additional dynamic range capability merely tends to decrease the captured image's quality).

SUMMARY

In one embodiment the disclosed concepts provide a method to capture an image based on a novel score, where the score is indicative of the number of clipped pixels in an image. The method includes determining capturing a first image of a scene (e.g., a pre-image) using a first exposure value; obtaining a first number of histograms that characterize the first image; selecting a number of bins from the plurality of histograms (each bin having a corresponding value); determining a weighted sum of the values from the selected histogram bins (e.g., the "score"); adjusting an image capture parameter based on the score; and capturing at least a second image using the adjusted image capture parameter. Illustrative image capture parameters include, but are not limited to, exposure time, exposure value, exposure ration, gain and aperture. In a color image, the score may be based on histograms from one or more color channels (e.g., one or more of an RGB image's red, green and blue channels). The disclosed score may also be used to determine when it may be appropriate to enter (or leave) a high dynamic range (HDR) image capture mode or to adjust the exposure ratio between an HDR operation's long- and short-exposure images. Methods in accordance with this disclosure may also be implemented as computer program instructions (stored in non-transitive computer program storage) that can be executed by one or more processors (e.g., single- and multi-core processors).

BRIEF DESCRIPTION OF THE DRAWINGS

FIG. 6 shows, in block diagram form, a multi-function electronic device in accordance with one embodiment.

DETAILED DESCRIPTION

Figure 1:
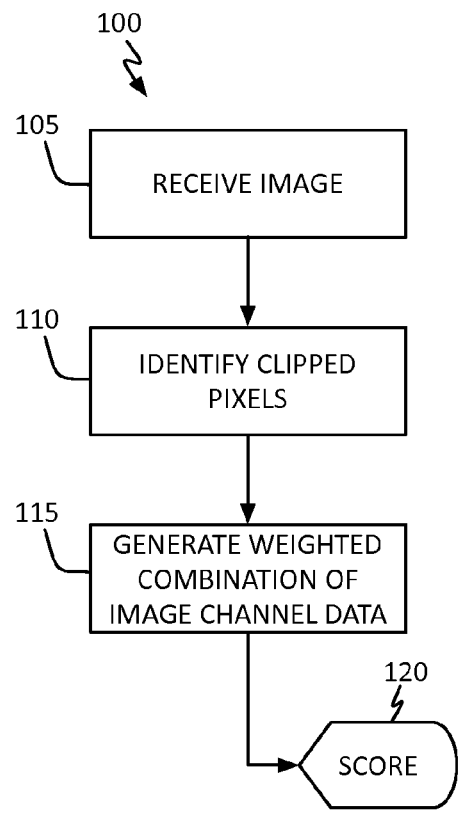
FIG. 1 shows, in flowchart form, an image scoring operation in accordance with one embodiment.

This disclosure pertains to systems, methods, and computer readable media for the use of a metric whose value that is especially sensitive to the information lost when an image's pixels are clipped (i.e., highlight information). The highlight metric value may be used as an image capture parameter, where larger highlight metric values are indicative of lost highlight information (more clipped pixels) as influenced or constrained, by example, by human perceptual preferences. One use of the disclosed highlight metric would be to determine what exposure is proper during high dynamic range (HDR) in a given situation or for a give scene. The disclosed highlight metric may also be used as a decision index to guide auto exposure policy, such as lowering (raising) the exposure target or underexposing (overexposing) the targeted scene so that the scene may be captured with no more than an acceptable number of clipped pixels.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the disclosed subject matter, resort to the claims being necessary to determine the scope of the disclosed inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of digital image capture systems having the benefit of this disclosure.

One method to determine an image's highlight metric value which accounts for the number of clipped pixels, and their concomitant loss of highlight information, would be to simply count the number of clipped pixels in the image. A more complicated approach would be to, for instance, weight the clipped pixel count from different channels of a color image so that the result would better correlate to human perception. For example, pixels corresponding to red flowers may all be clipped, yet not be disturbing to human eyes. Highlights also have different properties. Some are harsh with sharp transitions (e.g., a lighted bulb), while others are more transitional (e.g., sunshine upon a white wall/surface). The tolerance to clipping also varies from person to person, some are more tolerate while others are less so. A useful algorithm, vis-à-vis retention of highlight information, should take at least all of the above-identified perceptual factors into consideration.

Referring to FIG. 1, highlight metric operation 100 in accordance with one embodiment begins by receiving an image of a scene (block 105). A value indicative of the image's clipped pixels may then be determined or obtained (block 110). As used here, the term "clipped pixel" refers to a pixel whose value is greater than a specified clip-threshold. In embodiments that use 8-bits to represent each pixel channel, if the clip-threshold is 253, any pixel channel element whose value is greater than 253 (i.e., the 254 and 255 bins) may be considered clipped. In another embodiment, if the clip-threshold is 247, any pixel channel element whose value is greater than 247 may be considered clipped. It should be understood that the clip-threshold adopted may depend at least upon the specific image sensor and what the desired use of the image capture device is. Once identified, the clipped pixels may be weighted in a fashion to accommodate human perceptual factors and combined (block 115), to generate highlight metric value 120.

While the disclosed techniques to generate a highlight metric value (e.g., operation 100) are not so limited, the following assumes that images are in RGB format. In general, actions in accordance with block 115 that account for the perceptual factors identified above may use tail entries from the normalized red (R), green (G) and blue (B) channel histograms as shown in EQ. 1.

$$S_{HDR} = \sum_{i=1}^{a} w_R[i](H_R[i])^{p_R} + \sum_{j=1}^{b} w_G[j](H_G[j])^{p_G} + \sum_{k=1}^{c} w_B[k](H_B[k])^{p_G} + \text{offset},$$ EQ. 1 where $S_{HDR}$ represents highlight metric value 120, $H_R[i]$ represents the red channel's normalized count at the ith histogram bin, $w_R[i]$ represents the red channel's weight associated with the red channel's ith histogram bin, $p_R$ represents a power function associated with the red channel, and a represents the red channel's last channel histogram bin; 'a' represents what it means to be a clipped red pixel. The green and blue channels are similarly accounted for. (It should be noted that because clipping is a bright pixel phenomenon, a, b and c represent the bin number from the bright (high) end of their respective histogram: 1 represents the 255 bin; 2 represents the 254 bin, . . . ) Finally, offset represents an adjustment to the determined solution of EQ. 1 toward the target data range. One of ordinary skill in the art may appreciate that more complicated highlight score models than that expressed by EQ. 1 may be devised to, for example, model the factors affecting highlight clipping attributable to detailed perceptual models. One exemplary extension would be to use the sum of multiple powered terms of the histogram bins rather than the one shown above.

The number of histogram bins to aggregate (e.g., values a→c in EQ. 1) may be dependent, at least in part, on the chosen image sensor's noise level. For example, if the image sensor had no inherent noise the number of clipped pixels may be determined by counting the number of pixels in the histogram's highest bin. Because all image sensors inherently exhibit some noise, it has been found beneficial to aggregate a number of bins when determining the number of clipped pixels. For a digital imaging device having 8-bit RGB luminance data, in one embodiment the top two bins (representing bin values of 254 and 255) may be aggregated in determining a scene's $S_{HDR}$ 120; in another embodiment, the top 4 bins (representing bin values of 252→255) may be aggregated in determining a scene's $S_{HDR}$ 120. More generally, the number of bins to aggregate can be any number needed to account for system hardware operating characteristics and perceptual factors such as those identified above. By way of example, including more bins permits the acquisition of information related to "how" a pixel is clipped (e.g., harsh clipping with abrupt histogram transitions versus softer clipping with gradual histogram transitions).

It has been found that a sufficiently reliable score (i.e., one that accounts for at least all of the above-identified perceptual factors) may be obtained even when various aspects of EQ. 1 are simplified. One embodiment, for example:

$$S_{HDR} = \sum_{i=1}^{d} w_R(H_R[i])^p + \sum_{i=1}^{d} w_G(H_G[i])^p + \sum_{i=1}^{d} w_B(H_B[i])^p + \text{offset.}$$ EQ. 2

Here, the same histogram bins are inspected for each channel (bins 1→d), a single channel weight for each channel is adopted, and all histogram values are raised to a common power (p). (As above, index d represents the bin number from the bright (high) end of the respective histogram.)

EQS. 1 and 2 represent visual models, where the "work" of accounting for the impact different color channels have on a user's perception, a user's preferred properties of highlights, shadow-light transitions, tolerance to clipping, and similar perceptual variables is performed or provided by the histogram weighting factors $w_R$, $w_G$, $w_B$, and offset. Once the model is established, weights, offsets, and the power terms of a model, like that illustrated by EQS. 1 and 2, may be determined through examining a large data set of images for the particular imaging system for which such a model is to be used. In practice, the number of histogram bins aggregated may be chosen to obtain a defined "best performance" which, in one embodiment, is a trade-off between computational speed and computational cost (e.g., time required by one or more processors, or multiple cores in a single processor, to perform the computation). It has been found that increasing the number of histogram entries often improves the accuracy of the generated score, but after only a very few entries the accuracy increases slowly as each new histogram entry is used, while the cost of performing the added computations (and the time needed to obtain the necessary parameter values through training) increases regularly. For example, it has been found that using just two histogram bins may provide the needed accuracy to make Yes/No HDR decisions (i.e., d=2 in EQ. 2).

Figure 2:
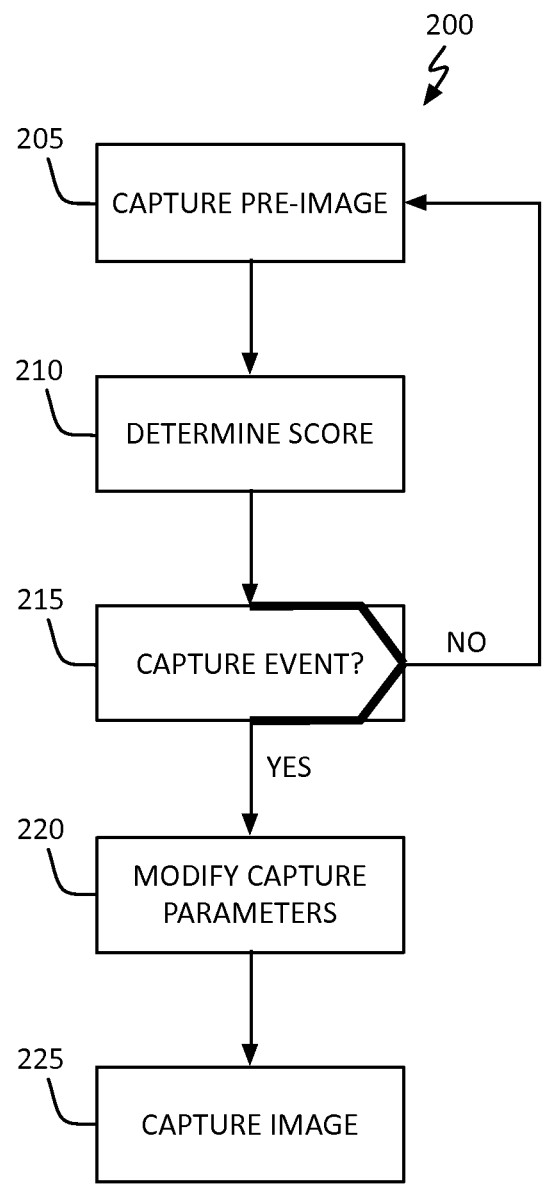
FIG. 2 shows, in flowchart form, a run-time scoring operation in accordance with one embodiment.

Referring to FIG. 2, run-time highlight metric value operation 200 in accordance with one embodiment captures a pre-image (block 205) and obtains a score in accordance with, for example, EQ. 2 (block 210). As used in this disclosure, a pre-image is an image that is captured for evaluation purposes by an imaging system prior to a user-initiated image capture event. If no capture event has occurred (the "NO" prong of block 215), operation 200 loops to block 205. If the pre-image is followed by a capture event (the "YES" prong of block 215), the score may be used to modify one or more image capture parameters such as, for example, the exposure value or exposure ratio (block 220) and, once modified, an image may be captured (block 225). Illustrative capture events include, but are not limited to, a user's activation of an image-capture button. In accordance with this disclosure, the score may be used to modify any adjustable or variable image capture parameter such as, for example, exposure time, exposure ratio, gain, and aperture.

Figure 3:
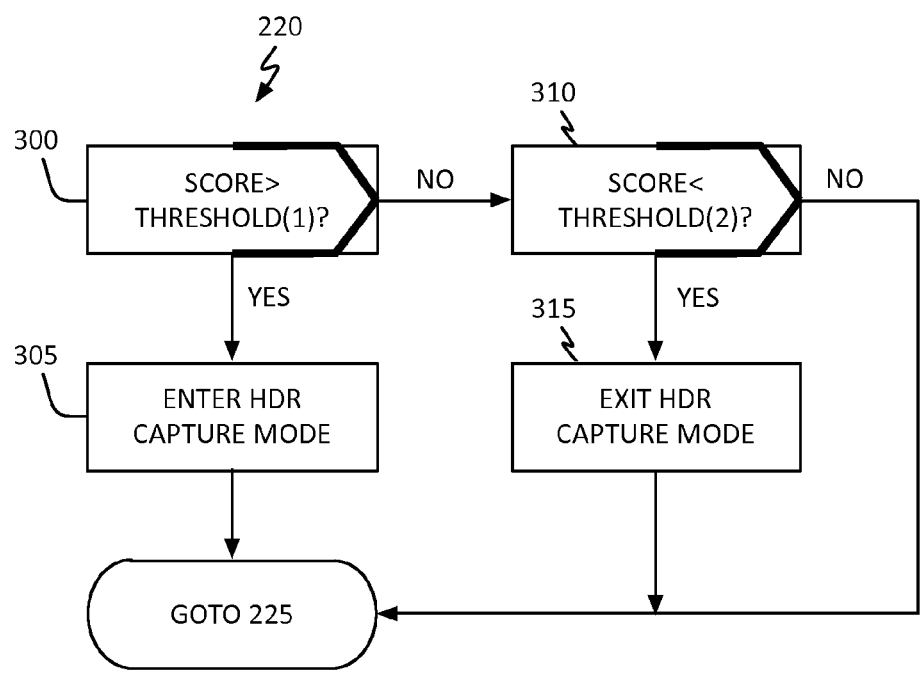
FIG. 3 illustrates, in flowchart form, how a run-time score in accordance with this disclosure may be used to enter or exit the HDR capture mode.
Figure 4:
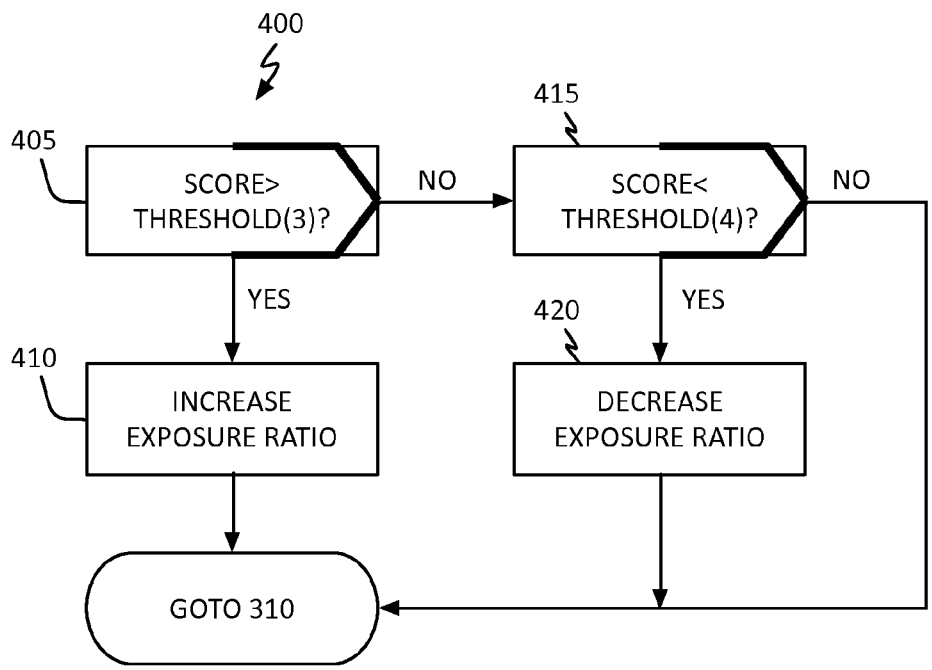
FIG. 4 illustrates, in flowchart form, how an image capture device's exposure ratio value may be altered during HDR capture operations.

Referring to FIGS. 3 and 4, two particular uses of highlight metric value or score 120 are illustrated. In FIG. 3, modify capture parameter operation 220 first determines if score 120 is greater than a first threshold (block 300) and, if it is (the "YES" prong of block 300), the image capture device may be put into HDR capture mode (block 305). In one embodiment, this action may occur automatically. In another embodiment, an indication may be given to a user that the HDR mode is recommended, leaving the ultimate decision to the user. If score 120 is not greater than the first threshold (the "NO" prong of block 300), another test may be made to determine if it is less than a second threshold (block 310). If score 120 is less than the second threshold (the "YES" prong of block 310), the capture device may be moved into regular (non-HDR) capture mode (block 315). As before, this action may be taken automatically or manually (e.g., by the user responding to a prompt). If score 120 is between the first and second thresholds (the "NO" prongs of 300 and 310), the imaging device's operational mode is not altered. Once in the HDR capture mode, FIG. 4 illustrates a methodology to alter the exposure ratio—the ratio between the exposure values of the long exposure and short exposure frames used during HDR capture operations. Exposure ratio operation 400 may first determine if score 120 is greater than a third threshold (block 405) and, if it is (the "YES" prong of block 405), the exposure ratio may be increased (block 410). In one embodiment, actions in accordance with block 410 may be made by increasing the exposure value of the long-exposure image. In another embodiment, the exposure value of the short-exposure image may be decreased. In yet another embodiment, the exposure values for both the long- and short-exposure images may be changed so as to effect an overall increase in the exposure ratio. If score 120 is not greater than the third threshold (the "NO" prong of block 405), another test may be made to determine if it is less than a fourth threshold (block 415). If score 120 is less than the fourth threshold (the "YES" prong of block 415), the capture device's exposure ratio may be decreased (block 420). Any combination of altering the exposure value of the long-exposure image and/or the exposure value of the short-exposure image to effect an overall decrease in the exposure ratio may be implemented in accordance with block 420. One of ordinary skill in the art will recognize that the precise values of the first, second, third, and fourth thresholds may be a function of myriad factors including the device's intended operating environment and target user. In addition, and as a practical matter, to avoid flickering when score 120 is close to one of the thresholds, a damping scheme may be used. Furthermore, the degree to which the exposure ratio is altered in accordance with block 410 or 420 is a design choice of the developer. For example, the exposure ratio may be altered by a specified amount during each execution of blocks 410 and/or 420. Alternatively, the exposure ratio may be altered by an amount that is related to the size of score 120. By way of example, the larger score 120 is, the more the exposure ratio may be increased and the smaller score 120 is, the more the exposure ratio may be decreased during any one iteration of blocks 410 and 420.

In one embodiment, implied by the way the score is aggregated from the image histogram, for example, only one of the three channels is used at run time (e.g., during run-time scoring operation 200). In another embodiment, any two of the three R, G and B channels may be used.

Figure 5:
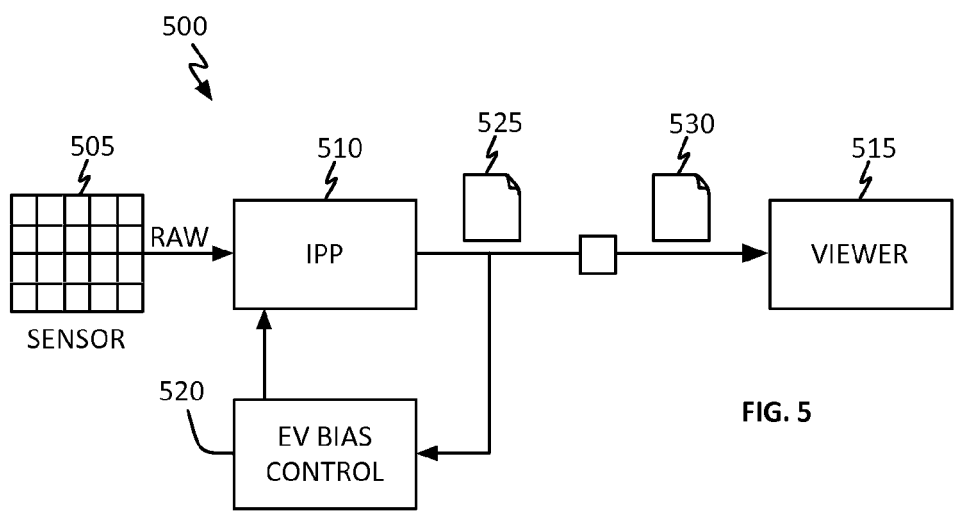
FIG. 5 shows, in block diagram form, an image capture system in accordance with one embodiment.

Referring to FIG. 5, simplified capture system 500 may include sensor 505, image processing pipeline (IPP) 510, viewer or view screen 515, and EV bias control 520. Sensor 505 could be any sensor compatible with capture system 500's functional goals. For example, sensor 505 could be a charge-coupled device (CCD) or a complementary metal-oxide semiconductor (CMOS) imager. Image processing pipeline 510 could be specialized hardware and/or special purpose software. Functionally, IPP 510 may perform multiple image processing tasks including, but not limited to, raw image processing (e.g., black level removal, lens shading correction, white balance, and the like) and RGB image processing (e.g., demosaicing, color correction and tone mapping operations) to generate image 525. Viewer 515 may be, for example, a preview screen designed to display pre-image 530 (also known as preview-image 530). Image capture devices in accordance with 500 may generate highlight metric value 120 from IPP output image 525, whereafter score 120 may be used to bias the exposure value controlled by IPP 510 via EV bias control 520. By way of example, if image 525 is determined to have too many clipped pixels (e.g., highlight metric value 120 is greater than a specified threshold), EV bias control 520 may bias the next image capture to EV− (taking as large or small a step as deemed appropriate by the system's designer), after which the process may be repeated until one or more image parameters are within a designated window (e.g., average image brightness, number of clipped pixels, predicted signal-to-noise ratio). Similarly, if the exposure value is determined to result in image 525 being too dark (e.g., the average image brightness is less than a specified threshold), EV bias control 520 may bias the next image capture to EV+ (again, the size of adjustment here may be any deemed appropriate to the system's designer). Alternatively, EV bias control 520 may be configured to maximize one or more parameters (e.g., the signal-to-noise ratio, image sharpness).

Referring to FIG. 6, a simplified functional block diagram of illustrative electronic device 600 is shown according to one embodiment. Electronic device 600 could be, for example, a mobile telephone, personal media device, portable camera, or a tablet, notebook or desktop computer system. As shown, electronic device 600 may include processor 605 (e.g., providing at least some of the function ascribed to EV bias control 520), display 610 (e.g., viewer 515), user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, image capture circuit or unit 650 (e.g., incorporating IPP 510 and, perhaps, at least a portion of EV bias control 520), video codec(s) 655, memory 660, storage 665, and communications bus 670.

Processor 605 may execute instructions necessary to carry out or control the operation of many functions performed by device 600 (e.g., such as the processing of images in accordance with FIGS. 1-5). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may indicate an image capture action or event. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs).

Image capture circuitry 650 may capture still and video images that may be processed to generate images and may, in accordance with this disclosure, include image processing pipeline 110. Output from image capture circuitry 650 may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605, graphics hardware 620, and image capture circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Further, FIGS. 1-4 show flowcharts illustrating various operations in accordance with this disclosure. In one or more embodiments, one or more of the disclosed steps may be omitted, repeated, and/or performed in a different order than that described herein. Accordingly, the specific arrangement of steps or actions shown in FIGS. 1-4 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to capture a digital image, comprising:
   capturing a first image of a scene using a first exposure value, the first image having one or more channels;
   obtaining one or more metrics, wherein each metric corresponds to one of the one or more channels, and wherein the metrics characterize the first image;
   determining a clipped pixel number for each channel, wherein each clipped pixel number is based on the channel's corresponding metric;
   determining a highlight metric value based on a weighted combination of the clipped pixel number from at least one of the one or more channels;
   adjusting the first exposure value to a second exposure value based on the highlight metric value;
   capturing a second image using the second exposure value; and
   storing the second image in a memory.

2. The method of claim 1, wherein adjusting the first exposure value comprises transitioning into a high dynamic range (HDR) image capture mode based on determining the highlight metric value is greater than a first threshold.

3. The method of claim 2, wherein capturing a second image comprises capturing a burst of two or more images at the second exposure value.

4. The method of claim 2, wherein transitioning into an HDR image capture mode comprises automatically transitioning into the HDR image capture mode.

5. The method of claim 2, wherein adjusting the first exposure value further comprises transitioning out of the HDR image capture mode based on determining the highlight metric value is less than a second threshold.

6. The method of claim 1, wherein adjusting the first exposure value comprises:
   determining an image capture device that captured the first image is in a high dynamic range (HDR) image capture mode; and
   increasing an exposure ratio of the image capture device based on determining the highlight metric value is greater than a first threshold, wherein the exposure ratio is based on the first exposure value and a second exposure value.

7. The method of claim 6, wherein adjusting the first exposure value further comprises reducing the exposure ratio of the image capture device based on determining the highlight metric value is less than a second threshold.

8. The method of claim 1, wherein adjusting the first exposure value to a second exposure value comprises:
   determining the highlight metric value is greater than a first threshold; and
   setting the second exposure value to a value that is less than the first exposure value.

9. The method of claim 1, wherein adjusting the first exposure value comprises adjusting the first exposure value to a second exposure value so as to maximize an image capture metric.

10. The method of claim 9, wherein the image capture metric comprises at least one of image sharpness and signal-to-noise ration.

11. A non-transitory program storage device comprising instructions stored thereon to cause one or more processors to:
- capture a first image of a scene using a first exposure value, the first image having one or more channels;
- obtain one or more metrics, wherein each metric corresponds to one of the one or more channels, and wherein the metrics characterize the first image;
- determine a clipped pixel number for each channel, wherein each clipped pixel number is based on the channel's corresponding metric;
- determine a highlight metric value based on a weighted combination of the clipped pixel number from at least one of the one or more channels;
- adjust the first exposure value to a second exposure value based on the highlight metric value;
- capture a second image using the second exposure value; and
- store the second image in a memory.

12. The non-transitory program storage device of claim 11, wherein the instructions to cause the one or more processors to adjust the first exposure value comprise instructions to cause the one or more processors to transition into a high dynamic range (HDR) image capture mode based on determining the highlight metric value is greater than a first threshold.

13. The non-transitory program storage device of claim 12, wherein the instructions to cause the one or more processors to capture a second image comprise instructions to cause the one or more processors to capture a burst of two or more images at the second exposure value.

14. The non-transitory program storage device of claim 11, wherein the instructions to cause the one or more processors to adjust the first exposure value to a second exposure value comprise instructions to cause the one or more processors to:
- determine the highlight metric value is greater than a first threshold; and
- set the second exposure value to a value that is less than the first exposure value.

15. The non-transitory program storage device of claim 11, wherein the instructions to cause the one or more processors to adjust the first exposure value comprise instructions to cause the one or more processors to adjust the first exposure value to a second exposure value so as to maximize an image capture metric.

16. An image capture system, comprising:
an image sensor;
memory operatively coupled to the image sensor;
a display operatively coupled to the memory; and
one or more processors operatively coupled to the image sensor, the memory and the display and configured to execute program instructions stored in the memory to cause the one or more processors to
- capture a first image of a scene using a first exposure value, wherein the first image comprises one or more channel's,
- display the first image on the display,
- obtain one or more metrics, wherein each metric corresponds to one of the one or more channels, and wherein the metrics characterize the first image,
- determine a clipped pixel number for each channel, wherein each clipped pixel number is based on the channel's corresponding metric,
- determine a highlight metric value based on a weighted combination of the clipped pixel number from at least one of the one or more channels,
- adjust the first exposure value to a second exposure value based on the highlight metric value,
- capture a second image using the second exposure value, and
- store the second image in the memory.

17. The image capture system of claim 16, wherein the instructions to cause the one or more processors to adjust the first exposure value comprise instructions to cause the one or more processors to transition into a high dynamic range (HDR) image capture mode based on determining the highlight metric value is greater than a first threshold.

18. The image capture system of claim 17, wherein the instructions to cause the one or more processors to capture a second image comprise instructions to cause the one or more processors to capture a burst of two or more images at the second exposure value.

19. The image capture system of claim 16, wherein the instructions to cause the one or more processors to adjust the first exposure value to a second exposure value comprise instructions to cause the one or more processors to:
- determine the highlight metric value is greater than a first threshold; and
- set the second exposure value to a value that is less than the first exposure value.

20. The image capture system of claim 16, wherein the instructions to cause the one or more processors to adjust the first exposure value comprise instructions to cause one or more processors to adjust the first exposure value to a second exposure value so as to maximize an image capture metric.

* * * * *